(12) United States Patent
Oh et al.

(10) Patent No.: US 9,336,118 B2
(45) Date of Patent: May 10, 2016

(54) ALLOCATING TEST CAPACITY FROM CLOUD SYSTEMS (71) Applicant: Hewlett-Packard Development Company, L.P., Houston, TX (US)

(72) Inventors: Sung Oh, Roseville, CA (US); Barry L. Goodwin, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 321 days.

(21) Appl. No.: 13/751,498

(22) Filed: Jan. 28, 2013

(65) Prior Publication Data
US 2014/0215271 A1 Jul. 31, 2014

(51) Int. Cl.
G06F 11/00 (2006.01)
G06F 11/34 (2006.01)
G06F 11/36 (2006.01)
G06F 9/50 (2006.01)

(52) U.S. Cl.
CPC .......... G06F 11/3442 (2013.01); G06F 9/5005 (2013.01); G06F 11/3668 (2013.01); *G06F 11/3419* (2013.01); *G06F 11/3433* (2013.01)

(58) Field of Classification Search
CPC ............ G06F 11/3668; G06F 11/36–11/3696; G06F 9/50–9/5088; G06F 11/3442
See application file for complete search history.

(56) References Cited

U.S. PATENT DOCUMENTS

| 6,477,665 | B1 | 11/2002 | Bowman-Amuah |
| 6,543,047 | B1 | 4/2003 | Vrhel et al. |
| 7,437,614 | B2 | 10/2008 | Haswell et al. |
| 7,461,296 | B2 | 12/2008 | Kuth |
| 8,612,599 | B2 * | 12/2013 | Tung et al. ..................... 709/226 |
| 8,769,102 | B1 * | 7/2014 | Zhou ................... G06F 11/3696 709/223 |
| 8,826,068 | B2 * | 9/2014 | Somendra ....................... 714/6.3 |
| 8,839,035 | B1 * | 9/2014 | Dimitrovich et al. ........... 714/25 |
| 8,924,791 | B2 * | 12/2014 | Gao et al. ................... 714/38.14 |
| 8,972,990 | B2 * | 3/2015 | Ashok ................. G06F 9/45558 718/1 |
| 9,047,410 | B2 * | 6/2015 | Markande et al. |
| 2004/0236843 | A1 | 11/2004 | Wing et al. |
| 2006/0217823 | A1 | 9/2006 | Hussey |
| 2007/0168970 | A1 * | 7/2007 | Li .......................... G06F 9/5038 717/124 |
| 2008/0082983 | A1 * | 4/2008 | Groetzner ............. G06F 9/5083 718/105 |
| 2009/0007074 | A1 * | 1/2009 | Campion .............. G06F 9/5072 717/124 |
| 2009/0300423 | A1 * | 12/2009 | Ferris ............................. 714/38 |
| 2009/0300605 | A1 | 12/2009 | Edwards et al. |
| 2011/0004916 | A1 * | 1/2011 | Schiffman ............ G06F 9/5011 726/1 |
| 2011/0010691 | A1 * | 1/2011 | Lu et al. ......................... 717/124 |
| 2012/0311012 | A1 * | 12/2012 | Mazhar ................. G06F 9/5088 709/201 |

(Continued)

FOREIGN PATENT DOCUMENTS

EP 2244443 10/2010

OTHER PUBLICATIONS

Mell et al., "The NIST Definition of Cloud Computing", Sep. 2011, NIST Special Publication 800-145.*

(Continued)

*Primary Examiner* — Michael Maskulinski
(74) *Attorney, Agent, or Firm* — Brooks, Cameron & Huebsch, PLLC (57) ABSTRACT

Allocating test capacity from cloud systems can include identifying a product to be tested. Allocating test capacity from cloud systems can include automatically allocating a test capacity during runtime in response to the identification, the test capacity being provided by a test controller coupled to a cloud system.

12 Claims, 3 Drawing Sheets

(56) References Cited

U.S. PATENT DOCUMENTS

| | | | | |
|---|---|---|---|---|
| 2013/0152047 | A1* | 6/2013 | Moorthi et al. | 717/124 |
| 2013/0191528 | A1* | 7/2013 | Heninger | H04L 43/04 709/224 |
| 2013/0219364 | A1* | 8/2013 | Falko | 717/124 |
| 2013/0268805 | A1* | 10/2013 | Lee | G06F 11/0793 714/15 |
| 2014/0289418 | A1* | 9/2014 | Cohen | G06F 11/3688 709/226 |
| 2015/0074281 | A1* | 3/2015 | Vendrow | G06F 8/60 709/226 |

OTHER PUBLICATIONS

Riungu-Kalliosaari et al., "Testing in the Cloud: Exploring the Practice", 2012, IEEE Software, pp. 46-51.*
Elilink Consulting,. "System Testing," Retrieved from http://www.elilink.com/testing_system.html, Dec. 2012, 2 pages.
Melville, Lee., "Large Scale Substation Automation: Overcoming Technical Challenges," Retrieved from http://www.electricenergyonline.com/?page=show_article&mag=39&article=303, Dec. 2012, 5 pages.
McDonald, Duncan., "Automated Regression for Mixed-Signal Verification," Retrieved from http://www.synopsys.com/Tools/Verification/AMSVerification/DesignAnalysis/Documents/CustomExploerer-Ultra-TechBgr.pdf, Apr. 2011, 5 pages.
On Path Technologies., "The Economic Benefit of ONPATH Network Infrastructure for Test Automation and Testing as a Service (TaaS) Applications," Retrieved from http://www.onpathtech.com/assets/CaseStudies/ ONPATHTestAutomationROICaseStudy_2.pdf, Jan. 2013, 2 pages.
Qualisystems., "Solutions for Cloud Infrastructure: Cloud Infrastructure Testing," Retrieved from http://www.qualisystems.com/site/content/t11.asp?Sid=83&Pid=715, Jan. 2013, 3 pages.
Cloudshare., "Pre-Production Cloud," Retrieved from http://www.cloudshare.com/, Jan. 2013, 2 pages.
Ferguson, Chris., "Joint Mission Environment Test Capability (JMETC) Improving Test and Training Capabilities," Feb. 21, 2012, 19 pages.

* cited by examiner

ALLOCATING TEST CAPACITY FROM CLOUD SYSTEMS

BACKGROUND

A business process may produce a particular product. Ensuring that the product functions as intended may involve testing the product. Such testing may be performed by a variety of physical test equipment having an ability (e.g., a capacity) to test the product.

DETAILED DESCRIPTION

With increasing pressure on organizations to improve performance of their business processes, the organizations may seek to increase efficiencies associated with the business process (e.g., products produced by the business processes), for instance, by pursuing efficient allocation of test capacity to test the products. For instance, pursuing efficient allocation of test capacity from cloud systems can help improve resource utilization, for example, by identifying a product to be tested and automatically allocating a test capacity during runtime in response to the identification, the test capacity being provided by a test controller coupled to a cloud system.

Test capacity can generally refer to an amount of capacity provided by a test controller to test a product, for example, an end product assembled by the business process), as described herein. As such, the business process may have a desire to test the product (e.g., the components of the product) prior to (e.g., following production of the components), during, and/or upon assembly, for example. Assembly refers to assembly of components (e.g., physical and/or software components) into the product. Examples of tests that can be performed using such test capacity can, for example, include load tests, version tests, and/or performance tests, as described herein.

Previous approaches attempting to provide test capacity may include predicting a test capacity for a physical factory (e.g., a test capacity for a number of products produced by the physical factory) and/or building physical equipment (an amount of test infrastructure based on the predicted test capacity) at the physical factory to provide the predicted test capacity to the physical factory. However, such approaches utilizing prediction and/or dedicated physical equipment can be expensive (e.g., time-consuming to build such physical equipment and/or involving manual interaction to develop specific tests based upon a particular architecture of the products to be tested), difficult, and/or ineffective, among other inefficiencies.

For example, in previous approaches, a physical factory may have dedicated test equipment (e.g., 32 test controllers) designed to support a predicted amount of demand (e.g., 1000 customer system test slots). A variation (e.g., a variation based upon a shift in a type and/or volume of products to be tested) in an actual demand from the predicted amount of demand (e.g., a reduction in a number of customer system test slots from 1000 to 100) may result in all or a portion of the dedicated test equipment being idle (e.g., 28 of the test controllers being idle). That is, such approaches may be unable to account for and/or unable to efficiently account for a change in demand (e.g., an inaccurate prediction and/or shifting client demands).

In contrast, examples of the present disclosure include methods, systems, and computer-readable and executable instructions for allocating test capacity from cloud systems. In various examples, a product to be tested can be identified, as described herein. For a test capacity to be allocated (e.g., automatically allocated) from cloud systems a given test capacity can be automatically allocated (e.g., to a factory assembling a given product) during runtime in response to the identification. In some examples, indentifying can include identifying a total number of products to be tested and automatically allocating can include automatically allocating a test capacity during runtime in response to the identification of the total number of products to be tested. The total number of products can, for example, be based upon a particular customers order (e.g., an order for 500 products to be tested). Such an order can be provided through a suitable means, for example, via a graphical user interface located on a factory floor associated with the products to be tested.

A test controller can refer to a suitable device having software, firmware, hardware, and/or logic to provide a test capacity (e.g., an amount of test capacity in response to a request) during runtime and/or to test a product using the test capacity. An idle test controller refers to a test controller providing a test capacity of which at least a portion (e.g., an idle portion) of the test capacity is unused (e.g., unused at given time and/or during a given period of time). The product can refer to a unit under test (UUT). Examples of UUT can, for example, include servers, computers (e.g., laptops, mobile device, etc.), monitors, and/or servers, among other products.

In various examples, a test capacity can be automatically allocated during runtime in response to the identification of the product to be tested. As described herein, automatically allocating can refer to executing instructions stored in memory to allocate a test capacity (e.g., allocating the test capacity provided by a lest executive controller) during runtime in response to the identification. Such automated allocation of test capacity can allow test controllers (e.g., idle test controllers) to be shared. For example, allocating (e.g., sharing) of test capacity (e.g., test capacity provided by physical test controllers at a given factory site) among geographically separated factory sites. Such allocation can promote efficiencies (e.g., a reduction in server room usage, power, support, and/or cost) and/or can provide a desired amount of flexibility (e.g., changing a test capacity at a physical factory upon demand) related to allocation of the test controllers (e.g., a test capacity provided by the test controllers).

In the following detailed description of the present disclosure, reference is made to the accompanying drawings that form a part hereof, and in which is shown by way of illustration how examples of the present disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

As will be appreciated, elements shown in the various examples herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, "a number of" an element and/or feature can refer to one or more of such elements and/or features. In addition, "for example" and similar phrasing is intended to mean, "by way of example and not by way of limitation".

Figure 1:
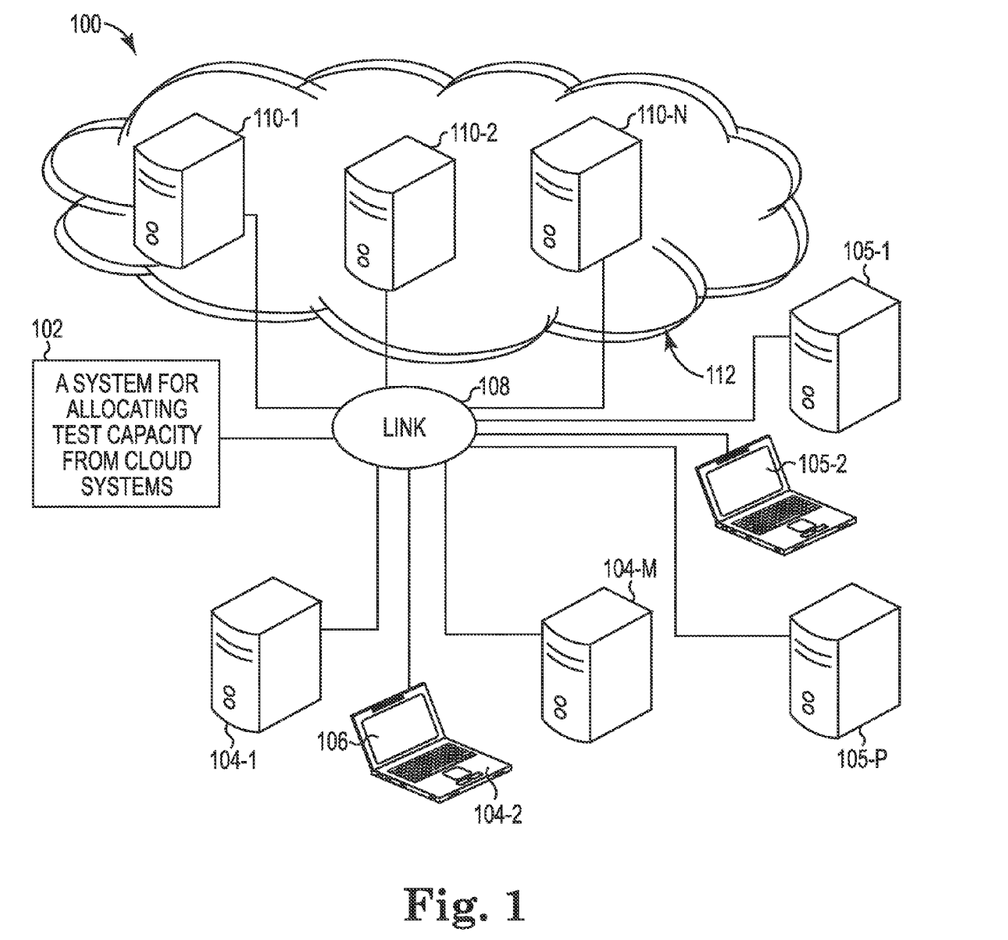
FIG. 1 illustrates a diagram of an example of an environment in which various examples of the present disclosure may be implemented.

FIG. 1 illustrates a diagram of an example of an environment in which various examples of the present disclosure may be implemented. Environment 100 is shown to include a system for allocating test capacity from cloud systems (e.g., 102), products to be tested 105-1, 105-2, . . . , 105-P, test controllers 110-1, 110-2, . . . , 110-N, client devices 104-1, 104-2, . . . , 104-M, and a link 108. The system for allocating test capacity from cloud systems (e.g., 102), described herein, represents a suitable combination of physical components (e.g., hardware) and/or programming to allocate test capacity from cloud systems.

In some examples, a request (e.g., including request for an amount of test capacity) can be provided (e.g., received) via the client devices (e.g., client devices 104-1, 104-2, . . . , 104-M). Providing a request can include executing instructions stored in memory to receive an input. The input can, for example, include a numeric, an alphabetic, and/or an alphanumeric input, among others. The input can be provided via a keyboard, mouse, touch-screen, audio input device, among other suitable input devices to provide the input. In some examples, the client devices (e.g., client devices 104-1, 104-2, . . . , 104-M) can include a graphical display (e.g., a graphical user interface 106) to promote providing the request.

The test capacity can, in various examples, be provided by a plurality of test controllers coupled to a cloud system 112. That is, the cloud system 112 can include a plurality of test controllers (e.g., test controllers 110-1, 110-2, . . . , 110-N). The plurality of test controllers (e.g., test controllers 110-1, 110-2, . . . , 110-N) represent a suitable devices to respond to requests (e.g., received from the client devices), provide a test capacity, and/or to test a product using the test capacity. For example, the plurality of test controllers can be allocated to a particular client device (e.g., a client device associated with a given UUT) of the client devices (e.g., client devices 104-1, 104-2, . . . , 104-M).

FIG. 1 depicts a single cloud system 112 containing the plurality of test controllers (e.g., test controllers 110-1, 110-2, . . . , 110-N) and three client devices (e.g., client devices 104-1, 104-2, . . . , 104-M), among others. However, the present disclosure is not so limited. That is, the type, number, and/or combination of the cloud system, the plurality of test controllers, and/or client devices, among others, can be a suitable number and/or combination to promote allocating test capacity from cloud systems, as described herein.

A given test controller (e.g., test controllers 110-1, 110-2, . . . , 110-N) can include a server(s) (e.g., a web server, a mainframe, a cloud server, an application server, a client server, and/or a data server, among other types of servers), hardware, software, and/or firmware to promote allocation of test capacity from cloud systems. Such a test controller can provide a test capacity. For instance, a test controller can include software, hardware, and/or firmware for conducting a load (e.g., a particular load) and/or a performance test (e.g., a particular performance test), among others.

Examples of tests that can be performed using such test capacity can, for example, include load tests, version tests (e.g., verification and/or updating of version information), and/or performance tests (e.g., validation of an effectiveness of a particular function of a product to be tested), among other tests. Such testing can promote identification issues with a function of an application (e.g., failure of an application and/or a failure of a function of an application to execute), and/or identifying a derivation from a standard (e.g., a performance standard). Examples of such a standard include, a desired response times (e.g., web page load times) and/or a desired processing speed (e.g., with regard to a given function).

Client devices 104-1, 104-2, . . . , 104-M can represent suitable computing devices with browsers and/or communications links, and the like, to receive and/or communicate such requests, and/or process the corresponding responses (e.g., receive the test capacity provided by a test controller in a cloud system). Client devices can cause a product to be tested (e.g., products 105-1, 105-2, . . . , 105-P). Causing can include executing instructions stored in memory to directly cause a test of a product (e.g., 105-1, 105-2, . . . , 105-P) using the allocated test capacity and/or to communicate data with an expectation that it be processed by another device to cause a test of a product using the allocated test capacity. Client devices 104-1, 104-2, . . . , 104-M can be located at a suitable number of locations (e.g., factories). Products to be tested 105-1, 105-2, . . . , 105-P can refer to storage device (e.g., databases), servers, network devices (e.g., network switches and/or routers, etc.), computers (e.g., laptops, mobile device, ect.), among other products.

As illustrated in FIG. 1, a cloud system 112 can include a public cloud system, a private cloud system, and/or a hybrid cloud system. For example, an environment (e.g., information technology (IT) environment) including a public cloud system and a private cloud system can include a hybrid environment and/or a hybrid cloud system. A public cloud system can include a service provider that makes resources (e.g., test controllers), available to the public over the Internet. A public cloud system can be free or offered for a fee, for example.

A private cloud system can include computing architecture that provides hosted services to a limited number of people behind a firewall. For, example, a private cloud can include an Enterprise Resource Planning (ERR) system (not show), a number of databases (not shown), and virtualization (e.g., virtual machines) (not shown). For instance, a private cloud system can include a computing architecture that provides hosted services to a limited number of computers behind a firewall. The ERP, for example, can integrate internal and external management information across an entire enterprise and/or organization. A number of databases can include an event database, event archive, configuration management database (CMDB), and/or a performance metric database (e.g., to promote performance tests, as described herein), among others.

A hybrid cloud, for example, can include a mix of traditional server systems, private cloud systems, public cloud systems, and/or dynamic cloud services. For instance, a hybrid cloud can involve interdependencies between physically and logically separated services of multiple systems. A hybrid cloud, for example, can include a number of clouds (e.g., two clouds) that can remain unique entities but can be bound together. For instance, the public cloud system and the private cloud system can be bound together, for example, through the application in the public cloud system and the ERP in the private cloud system.

Such cloud systems can promote virtualization. Virtualization can, for example, include the creation of a number of virtual resources that are can be drawn from physical resources (e.g., the test controllers 110-1, 110-2, . . . , 110-N) but not directly limited by the capabilities of particular physical resources (e.g., limited to a physical proximity to a location associated with the particular physical resource). Examples of virtualized resources include hardware platforms, operating systems, storage devices, and/or network resources, among others. For example, a virtual test controller can provide up to a particular test capacity provided by one, less than one, or more than one physical test controller (e.g., the test controllers 110-1, 110-2, . . . , 110-N) depending on the amount of test capacity provided by the virtual test controller storage device and therefore not directly limited by the capabilities (e.g., limited to a particular geographic location) of a particular device(s) (e.g., the test controllers 110-1, 110-2, . . . , 110-N). In some examples, the test controller can be coupled to the cloud system to provide the test capacity to test the product (e.g., a UUT) located in a product environment that is separate and distinct from the cloud system. A product environment refers to an environment in that can enable a product to be tested.

Link 108 represents a cable, wireless, fiber optic, or remote connections via a telecommunication link, an infrared link, a radio frequency link, or other suitable connectors or systems that provide electronic communication. The link 108 can include, for example, an intranet, the Internet, or a combination of both, among other communication interfaces. Link 108 can also include intermediate proxies, routers, switches, load balancers, and the like.

In some examples, the link 108 can be coupled to a test controller, for example, via test controller interface (not shown). The test controller interface can include a web interface and/or a graphical interface (e.g., a graphical user interface). Such interface(s) can facilitate display of the plurality test controllers (e.g., a total number of test controllers) coupled to a cloud system, an allocation status of each of the total number of test controllers (e.g., an indication of whether or not a particular test controller is allocated (e.g., whether or not a portion of the test capacity provided by a particular controller is allocated to client device and/or a factory), a test capacity of the plurality of test controllers (e.g., a total test capacity, a test capacity of each of the plurality of test controllers, among other items capable of being displayed that correspond to the plurality of test controllers and/or allocation thereof. In some examples, such a test controller interface can provide notification (e.g., notifying an information technology (IT) administrator), as described herein. Such display(s) (e.g., an active overview of the plurality of test controllers) and/or notification(s) can assist an IT administrator in, for example, determining a desire to add addition test controllers to the total number of test controllers coupled to the cloud system. However the present disclosure is not so limited. That is, the test controller interface can include a suitable combination of software, firmware, hardware, and/or logic to promote allocating test capacity from cloud systems.

Figure 2:
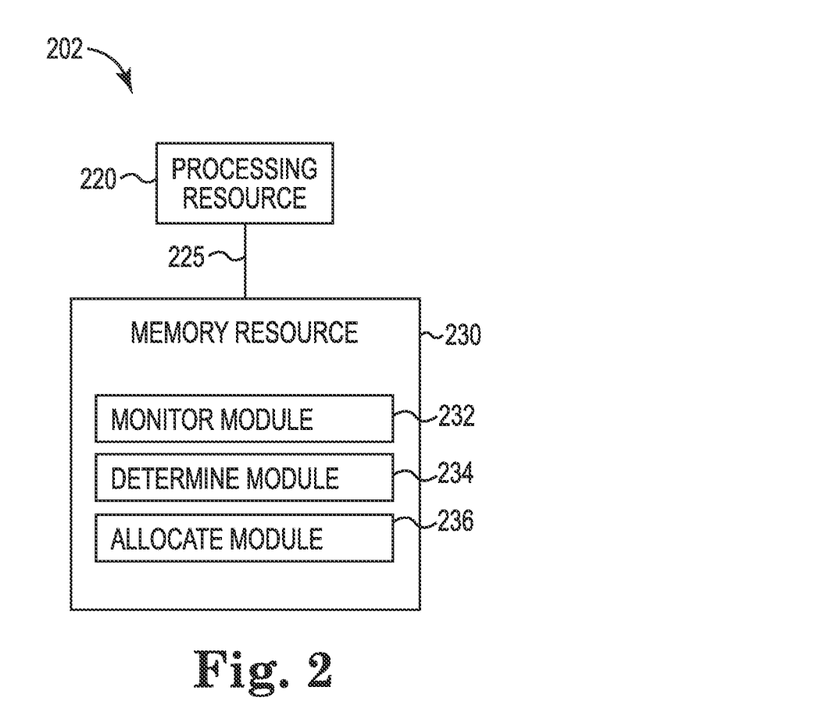
FIG. 2 illustrates a block diagram of an example of a system for allocating test capacity from cloud systems according to the present disclosure.

FIG. 2 illustrates a block diagram of an example of a system for allocating test capacity from cloud systems according to the present disclosure. A system 202 can utilize software, hardware, firmware, and/or logic to perform a number of functions. The system 202 can be a suitable combination of hardware and program instructions for allocating test capacity from cloud systems. The hardware, for example can include a processing resource 220, a memory resource 230 (e.g., computer-readable medium (CRM)).

A processing resource 220, as used herein, can include a suitable number of processing resources capable of executing instructions stored by a memory resource 230. Processing resource 220 may be integrated in a single device or distributed across devices. The program instructions (e.g., computer-readable instructions (CRI)) can include instructions stored on the memory resource 230 and executable by the processing resource 220 to implement a desired function (e.g., identifying a product to be tested, etc.).

The memory resource 230 can be in communication with a processing resource 220. A memory resource 230, as used herein, can include a suitable number of memory components capable of storing instructions that can be executed by processing resource 220. Such memory resource 230 can be a non-transitory CRM. Memory resource 230 may be integrated in a single device or distributed across devices. Further, memory resource 230 may be fully or partially integrated in the same device as processing resource 220 or it may be separate but accessible to that device and processing resource 220. The system 202 may, for example, be implemented on a client device and/or on a collection of collection of client devices (e.g., a combination of client devices).

The processing resource 220 can be in communication with a memory resource 230 storing a set of CRI executable by the processing resource 220, as described herein. The CRI can also be stored in remote memory managed by a server and represent an installation package that can be downloaded, installed, and executed.

Processing resource 220 can execute CRI that can be stored on an internal or external memory resource 230. The processing resource 220 can execute CRI to perform various functions, including the functions described herein. For example, the processing resource 220 can execute CRI to automatically allocate an additional test controller of the plurality of test controllers during runtime in response to an event, the additional test controller providing an additional test capacity.

The CRI can include a number of modules 232, 234, and 236. The number of modules 232, 234, and 236, can include CRI that when executed by the processing resource 220 can perform a number of functions. The number of modules 232, 234, and 236 can be sub-modules of other modules. For example, the monitor module 232 and the determine module 234 can be sub-modules and/or contained within the same computing device. In another example, the number of modules 232, 234, and 236 can include individual modules at separate and distinct locations (e.g., computer-readable medium, etc.).

In various examples, the system can include a monitor module 232. A monitor module 232 can include CRI that when executed by the processing resource 220 can provide a number of monitoring functions. The monitor module 232 can, in various examples, monitor (e.g., automatically monitor) a test controller (e.g., a test controller of a plurality of test controllers coupled to a cloud system) providing a test capacity to test a product. For instance, the instructions can, in some examples, include instructions to cause the processing resource 220 to monitor an amount of test capacity being provided by the test controller and/or a testing load (e.g., a testing load associated with a number of UUT). Monitoring (e.g., automatic monitoring) can include active monitoring (e.g., continuous monitoring), periodic monitoring (e.g., repeated upon elapse of a given period of time), and/or monitoring following a prompt (e.g., upon receipt of a request, as described herein), among others. Periodic time monitoring periods can be specified by an IT administer and/or be based upon an SLA, for example.

In some examples, the monitor module 232 can include instructions to store local settings (e.g., local settings determined during monitoring a test controller) associated with the test controller. Examples of local settings can include network settings, factory information (e.g., physical location information), and/or product information (e.g., a type and/or volume to product(s) to be tested), among other types of information (e.g., local settings) to promote allocation of test capacity in cloud system.

In some examples, the system can include a determine module 234. The determine module can include CRI that when executed by the processing resource 220 can provide a number of determine functions. The determine module 234 can, in various examples, automatically determine an additional test capacity to test the product. Such automatic determination can, in some examples, be based on a total number of products to be tested. For instance, a particular number of products can correspond to a total amount of test capacity (e.g., a total amount of test capacity provided by a known number of additional test controllers). Such a test capacity can be determined by a prior knowledge (e.g., determined by an information technology administrator and/or be based upon a service level agreement (SLA)), among other ways.

In some examples, the determine module 234 can include instructions to provide a notification if the determined additional test capacity exceeds a total capacity of the number of additional test controllers available in a cloud system. For instance, such a notification can be provided to an IT administrator, among others. The notification can include audio and/or visual notification. For example, the notification can include an email can be provided to a computer associated with an IT administer, among other notifications.

An allocate module 236 can include CRI that when executed by the processing resource 220 can perform a number of allocation functions. In some examples, where the instructions to allocate include instructions to allocate the additional test capacity that satisfies the determined additional test capacity to test the product. Hence, a number of additional test controllers can, for example, be allocated (e.g., temporarily allocated to a client device and/or a given factory) to provide the determined additional test capacity.

In some examples, the instructions to allocate can include instructions to allocate the additional test capacity that satisfies the determined additional test capacity to test the product. Hence, a number of additional test controllers can, for example, be dedicated to provide the determined additional test capacity that satisfies the determined additional test capacity to test the product.

Alternatively or in addition, the allocate module 236 can include instructions to automatically allocate an additional test controller of the plurality of test controllers during runtime in response to an event, the additional test controller providing an additional test capacity. Examples of such instructions can include JavaScript® instructions, among others suitable to promote such allocation functions.

Examples of events can include when the test capacity reaches a base test capacity and/or when an updated version of a particular test (e.g., a test controller) is available, among others. That is, in some examples, an event can include a presence in the cloud system of an additional test controller having comparatively updated version information with respect to version information associated with the test controller (e.g., a test controller allocated to the product to best tested). In some examples, the event can include when the test capacity reaches a base test capacity. As described herein, a base test capacity refers to a number (e.g., a percentage) of a total testing capacity (e.g., a total testing capacity of a given test controller) that can qualify as an event if the number is met. The base test capacity can be met if an actual test capacity (e.g., an idle amount of test capacity provided by a given test controller) meets and/or drops below the base test capacity. For example, a test controller allocated to a product to be tested can, for example, utilize a percentage (e.g., 50%) of a total test capacity provided by the test controller as a base test capacity for the test controller. In such an example scenario, an additional test controller can be allocated to provide the additional test capacity if the base test capacity is met. In some examples, the base test capacity can be assigned each of the plurality of test controllers.

In some examples, the instructions can include instructions to balance a testing load (e.g., a test load associated with a UUT). Balancing can include allocating a particular test capacity for the test controller and/or the number of additional test controllers to provide a desired balance of an overall test load between the test controller and/or the number of additional test controllers. Examples of such balancing can include balancing equal and/or unequal portions of the overall test load between the test controller and the number of additional test controllers. For instance, such a testing load can, in some examples, be balanced (e.g., equally balanced) between of the test controller and the number of additional test controllers allocated to test the product. Alternatively or in addition, the overall test load can be balanced among the number of additional test controllers and/or a total number of the plurality of test controllers coupled to the cloud. Such balancing can promote efficient allocation of test capacity from cloud systems, among other benefits.

The memory resource 230 can be integral, or communicatively coupled, to a computing device, in a wired and/or a wireless manner. For example, the memory resource 230 can be an internal memory, a portable memory, a portable disk, or a memory associated with another computing resource (e.g., enabling CRIs to be transferred and/or executed across a network such as the Internet).

The memory resource 230 can be in communication with the processing resource 220 via a communication path 225. The communication path 225 can be local or remote to a computing device) associated with the processing resource 220. Examples of a local communication path 225 can include an electronic bus internal to a computing device where the memory resource 230 is one of volatile, non-volatile, fixed, and/or removable storage medium in communication with the processing resource 220 via the electronic bus.

The communication path 225 can be such that the memory resource 230 is remote from the processing resource (e.g., 220), such as in a network connection between the memory resource 230 and the processing resource (e.g., 220). That is, the communication path 225 can be a network connection. Examples of such a network connection can include a local area network (LAN), wide area network (WAN), personal area network (PAN), and the Internet, among others. In such examples, the memory resource 230 can be associated with a first computing device and the processing resource 220 can be associated with a second computing device (e.g., a Java® server). For example, a processing resource 220 can be in communication with a memory resource 230, wherein the memory resource 230 includes a set of instructions and wherein the processing resource 220 is designed to carry out the set of instructions.

The processing resource 220 can be coupled to the memory resource 230 to execute CRI to perform various functions. CRI can be executed to monitor a test controller of a plurality of test controllers coupled to a cloud system. The test controller providing a test capacity to test a product. CRI can be executed to automatically allocate an additional test controller of the plurality of test controllers during runtime in response to an event, the additional test controller providing an additional test capacity.

However, the present disclosure is not so limited. That is, the product, test infrastructure, and/or the testing can be a suitable combination of products, test infrastructure, and/or tests to efficiently test the product(s) and promote allocating of test capacity from cloud systems. More specifically, a given number of the plurality of test controllers allocated to a particular site (e.g., a factory) can be varied (e.g., from zero controllers to a suitable number of test controllers) in order to promote allocating test capacity from cloud systems.

Figure 3:
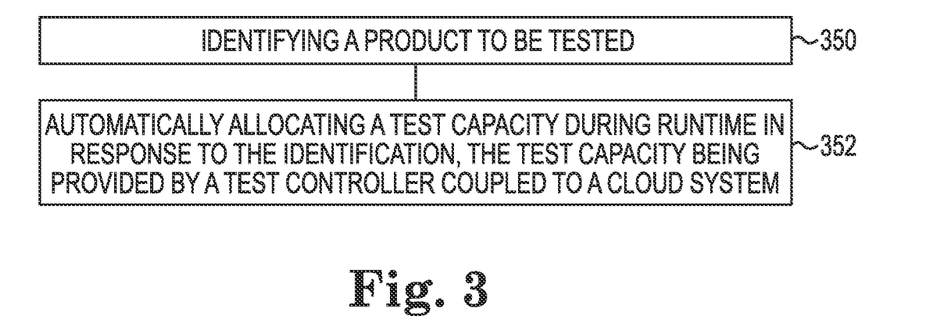
FIG. 3 illustrates a block diagram of an example of a method for allocating test capacity from cloud systems according to the present disclosure.

FIG. 3 illustrates a block diagram of an example of a method for allocating test capacity from cloud systems according to the present disclosure. As shown at 350, in various examples, the method can include identifying a product to be tested, as described herein. Identifying can include executing instructions stored in memory to identify a product to be tested. As shown at 352, in various examples, the method can include automatically allocating a test capacity during runtime in response to the identification, the test capacity being provided by a test controller coupled to a cloud system, as described herein. Automatically allocating can include executing instructions stored in memory to automatically allocating a test capacity during runtime in response to the identification.

In some examples, the method can include automatically identifying a presence of the product to be tested. For example, identifying the presence of the product can, for example, include identification of a presence of a particular product at various stages of assembly, as described herein.

In some examples, the method can includes performing a performance test of the product using the allocated test capacity as a result of the product being assembled. Performance testing can, for example, validate an effectiveness of a particular product (e.g., a function and/or capability of the particular product). The product (e.g., a fully assembled product) can be tested and/or a number of components (e.g., a memory resource, a communications link, and/or a memory, among others) of the product can be tested. For example, a given server can include components such as a blade, a rack, a communications link, and/or a number of cooling equipment, among other components. Testing (e.g., performance testing) can be performed on some and/or all of the components of the given server (e.g., testing a communications speed associated with the communications link of the server).

In some examples, automatically allocating can include allocating the test capacity of an idle test controller (e.g., an idle potion of the test capacity of the idle controller) coupled to the cloud system. That is, the test capacity can, for example, be allocated to a particular factory (e.g., a factory housing a number of client devices that can cause the testing of a given product) and/or to a particular client device of a number of client devices. Such allocation can include allocation of at least a portion (e.g., an idle portion) of a test capacity provided by a test controller coupled to the cloud system. For example, an idle test controller having a given test capacity can be allocated (e.g., allocation of an idle portion of the test capacity) in a manner that provides the test capacity to a particular factory and/or client device. However, the present disclosure is not so limited. That is, the allocation can include allocation of a suitable portion of the test capacity to promote allocating test capacity from cloud systems, as described herein.

Such allocation may or may not directly relate to a UUT (e.g., a product under test at a given time). For instance, such allocation can promote testing of a product (e.g., a UUT) and/or balancing a test load, as described herein.

In some examples, the test capacity can be automatically unallocated from the product following completion of the performance test. For example, a test capacity allocated to test a given product that has been assembled (e.g., fully assembled) can, for example, be unallocated following performance testing (e.g., successful performance) of the given product As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processing resource.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for allocating test capacity from cloud systems, comprising:
    identifying a product to be tested with a test;
    automatically allocating a test capacity during runtime in response to the identification, the test capacity being provided by a test controller of a plurality of test controllers coupled to a cloud system,
    allocating an additional test controller of the plurality of test controllers during runtime of the allocated test controller performing the test, the additional test controller providing a portion of an additional test capacity to perform the test when the test capacity reaches a base test capacity; and
    providing a notification that the additional test capacity exceeds a total capacity of the additional test controller when the total capacity is comparatively less than the additional test capacity.

2. The method of claim 1, wherein identifying includes identifying a total number of products to be tested and wherein automatically allocating includes automatically allocating the test capacity during runtime in response to the identification of the total number of products to be tested.

3. The method of claim 1, wherein the method includes performing a performance test of the product using the allocated test capacity as a result of the product being assembled.

4. The method of claim 1, wherein the method includes automatically unallocating the test capacity from the product following completion of the performance test.

5. The method of claim 1, wherein automatically allocating includes allocating an idle portion of the test capacity provided by the test controller.

6. A non-transitory computer-readable medium storing a set of instructions to allocate test capacity from cloud systems executable by a processing resource to:
    monitor a test controller of a plurality of test controllers coupled to a cloud system having a test capacity to test a product;
    automatically allocate an additional test controller of the plurality of test controllers during runtime of the test controller when the test capacity reaches a base test capacity during runtime testing of the product, the additional test controller providing a portion of an additional test capacity to test the product; and
    provide a notification that the additional test capacity exceeds a total capacity of the additional test controller when the total capacity is comparatively less than the additional test capacity.

7. The medium of claim 6, wherein the instructions to monitor include instructions to automatically monitor the test controller coupled to the cloud system having the test capacity to test the product located in a product environment that is separate and distinct from the cloud system.

8. A system for allocating test capacity from cloud systems, comprising:

a processing resource;

a non-transitory computer-readable medium storing a set of instructions executable by a processing resource to:

automatically monitor a test controller providing a test capacity to test a product;

automatically determine additional test capacity to test the product when the test capacity reaches a base test capacity;

automatically allocate a number of additional test controllers of the plurality of test controllers during runtime of the test controller in response to the determination, the number of additional test controllers providing a portion of the determined additional test capacity; and provide a notification that the determined additional test capacity exceeds a total capacity of the number of additional test controllers when the total capacity is comparatively less than the determined additional test capacity.

9. The system of claim 8, wherein the instructions to determine include instructions to determine the additional test capacity based on a total number of products to be tested.

10. The system of claim 8, wherein the instructions to allocate include instructions to allocate the additional test capacity that satisfies the determined additional test capacity to test the product.

11. The system of claim 8, wherein the medium storing computer executable instructions thereon includes instructions to balance a testing load between the test controller and the number of additional test controllers allocated to test the product.

12. The system of claim 8, wherein the instructions to monitor the test controller include instructions to store local settings associated with the test controller.

* * * * *